(12) United States Patent
Kim et al.

(10) Patent No.: US 9,840,163 B2
(45) Date of Patent: Dec. 12, 2017

(54) COOLING FAN CONTROL METHOD FOR VEHICLE

(71) Applicant: Hyundai Motor Company, Seoul (KR)

(72) Inventors: Jae Yeon Kim, Gyeonggi-do (KR); Seung Hyun Won, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 40 days.

(21) Appl. No.: 15/180,733

(22) Filed: Jun. 13, 2016

(65) Prior Publication Data

US 2017/0166083 A1    Jun. 15, 2017

(30) Foreign Application Priority Data

Dec. 10, 2015 (KR) .......................... 10-2015-0176323

(51) Int. Cl.
| | | |
|---|---|---|
| *G06F 7/00* | (2006.01) | |
| *B60L 11/18* | (2006.01) | |
| *B60H 1/00* | (2006.01) | |

(52) U.S. Cl.
CPC ...... *B60L 11/1892* (2013.01); *B60H 1/00878* (2013.01); *B60L 11/1874* (2013.01); *B60L 2240/36* (2013.01)

(58) Field of Classification Search
CPC .............. B60L 11/1892; B60L 11/1874; B60L 2240/36; B60H 1/00878; H01M 8/04134; H01M 8/04358; H01M 8/04723; H01M 2008/1095; H01M 8/04955; H01M 8/04268; H01M 8/04029
USPC ........................................................ 701/1, 36
See application file for complete search history.

(56) References Cited

U.S. PATENT DOCUMENTS

| | | | | |
|---|---|---|---|---|
| 4,794,537 A | * | 12/1988 | Adasek .............. | B60H 1/00814 237/5 |
| 4,988,930 A | * | 1/1991 | Oberheide .............. | F01P 7/048 318/42 |
| 5,845,612 A | * | 12/1998 | Lakerdas .................. | F01P 5/06 123/41.01 |

(Continued)

FOREIGN PATENT DOCUMENTS

| | | |
|---|---|---|
| JP | 2782968 B2 | 8/1998 |
| JP | 2001-317353 A | 11/2001 |

(Continued)

*Primary Examiner* — Jaime Figueroa
(74) *Attorney, Agent, or Firm* — Mintz Levin Cohn Ferris Glovsky and Popeo, P.C.; Peter F. Corless

(57) ABSTRACT

A method of controlling cooling fans for a vehicle is configured to control operation speeds of first and second cooling fans depending on a running state and operation of an air conditioner of the vehicle in a cooling module including a stack radiator, an electrical equipment radiator disposed in front of the stack radiator, a condenser disposed in parallel with reference to a width direction of the electrical equipment radiator and the vehicle, and the first and second cooling fans being provided at positions respectively corresponding to the electrical equipment radiator and the condenser in the rear of the stack radiator, including: independently controlling operation of each cooling fan by comparing required speeds of the cooling fans of constituent elements when operating the cooling fans provided as a pair in the cooling module depending on the running state and the operation of the air conditioner in the electric vehicle.

12 Claims, 2 Drawing Sheets

(56) References Cited

U.S. PATENT DOCUMENTS

| | | | | |
|---|---|---|---|---|
| 6,067,489 | A * | 5/2000 | Letang | F01P 7/04 123/299 |
| 6,629,411 | B2 * | 10/2003 | Buscher | F01P 7/044 137/115.14 |
| 7,508,146 | B2 * | 3/2009 | Simofi-llyes | F01P 7/048 318/568.18 |
| 8,209,073 | B2 * | 6/2012 | Wijaya | B60H 1/3205 165/42 |
| 8,720,538 | B2 * | 5/2014 | Hiyama | B60H 1/00271 165/10 |
| 9,057,317 | B2 * | 6/2015 | Vuk | B60H 1/00828 |
| 2004/0031277 | A1 * | 2/2004 | Hirose | B60H 1/3205 62/186 |
| 2006/0120903 | A1 * | 6/2006 | Iwasaki | F01P 7/048 417/423.1 |
| 2010/0100266 | A1 * | 4/2010 | Yoshinori | B60K 1/04 701/22 |
| 2011/0132030 | A1 * | 6/2011 | Kim | B60H 1/00885 62/507 |
| 2012/0247728 | A1 * | 10/2012 | Johnson | F28F 27/00 165/95 |
| 2015/0101778 | A1 * | 4/2015 | Kim | F01P 3/12 165/41 |
| 2016/0082861 | A1 * | 3/2016 | Gauthier | B60L 11/1874 165/287 |

FOREIGN PATENT DOCUMENTS

| | | |
|---|---|---|
| JP | 2004-353554 A | 12/2004 |
| JP | 2013-154755 A | 8/2013 |
| JP | 2014-076792 A | 5/2014 |
| KR | 10-0411037 B1 | 12/2003 |
| KR | 10-2009-0111946 A | 10/2009 |
| KR | 10-2011-0023345 A | 3/2011 |
| KR | 10-2015-0071540 A | 6/2015 |
| KR | 10-2015-0071814 A | 6/2015 |
| WO | WO 2012127348 A1 * | 9/2012 ........ H01M 8/04029 |

* cited by examiner

COOLING FAN CONTROL METHOD FOR VEHICLE

CROSS-REFERENCE TO RELATED APPLICATION

This application claims under 35 U.S.C. §119(a) the benefit of Korean Patent Application No. 10-2015-0176323 filed in the Korean Intellectual Property Office on Dec. 10, 2015, the entire contents of which are incorporated herein by reference.

BACKGROUND (a) Field of the Invention

The present invention relates to a method of controlling a cooling fan for a vehicle, more particularly, to a method of controlling a cooling fan in which power consumption is minimized by controlling operation of cooling fans provided as a pair in a cooling module in an electric vehicle depending on a vehicle state.

(b) Description of the Related Art

In order to increase energy efficiency and reduce environmental pollution, development of an environmentally friendly vehicle that can substantially replace an internal combustion engine vehicle is desirable, and such an environmentally friendly vehicle can be classified into: an electric vehicle that is driven using a fuel cell or electricity as a power source, and a hybrid vehicle that is driven using an engine and an electric battery.

In an electric vehicle, a stack radiator cooling the fuel cell or the battery, an electrical equipment radiator cooling electrical equipment, a condenser, and a cooling module including cooling fans are disposed in front of the vehicle.

The cooling module efficiently cools the fuel cell or the battery and the electrical equipment depending on a running state of the vehicle and the operation of an air conditioner system, and it is required to improve cooling performance of the air conditioner system.

However, to ensure improved performance of the cooling module, capacity of the cooling fans must be increased and the cooling fans must be efficiently controlled, but it is difficult to ensure a mounting space in the limited engine compartment space, and as required cooling temperatures of the constituent elements are different, there is a drawback that it is difficult to control the cooling fans to meet the required cooling temperature of each of the constituent elements.

Also, among the required cooling temperatures of the constituent elements, when operating the cooling fans depending on a maximum cooling temperature, other constituent elements are unnecessary cooled, and the power consumption of the cooling fans is increased such that a maximum travel distance (i.e., range) of the vehicle is shortened.

The above information disclosed in this Background section is only for enhancement of understanding of the background of the invention and therefore it may contain information that does not form the prior art that is already known in this country to a person of ordinary skill in the art.

SUMMARY

Accordingly, the present invention provides a method of controlling cooling fans for a vehicle that increases an entire travel distance (i.e., range) of the vehicle and prevents unnecessary power consumption by minimizing power consumption of the cooling fans through independent control of the operation of each cooling fan by comparing required speeds of the cooling fans of the constituent elements when operating the cooling fans provided as a pair in a cooling module depending on the running state and the operation of the air conditioner in the electric vehicle.

A method of controlling cooling fans for a vehicle according to an exemplary embodiment of the present invention to control operation speeds of first and second cooling fans depending on a running state and operation of an air conditioner of a vehicle in a cooling module including a stack radiator, an electrical equipment radiator disposed in front of the stack radiator, a condenser disposed in parallel with reference to a width direction of the electrical equipment radiator and the vehicle, and first and second cooling fans provided at positions respectively corresponding to the electrical equipment radiator and the condenser in the rear of the stack radiator, includes: initiating starting of the vehicle to be driven; sensing a stack temperature and setting a first required speed A of the first cooling fan required by the stack radiator and a first required speed B of the second cooling fan; sensing a temperature of electrical equipment and setting a second required speed C of the first cooling fan required by the electrical equipment radiator; determining whether the air conditioner is operated; sensing an air conditioner pressure and setting a second required speed D of the second cooling fan required by the condenser if it is determined that the air conditioner is operated; calculating whether the first required speed A of the first cooling fan is equal to or larger than the second required speed C of the first cooling fan and the first required speed B of the second cooling fan is equal to or larger than the second required speed D of the second cooling fan; operating the first cooling fan with the first required speed A of the first cooling fan and the second cooling fan with the first required speed B of the second cooling fan if the condition is satisfied in the calculating step; determining whether the coolant temperature and the air conditioner pressure of the stack and the electrical equipment are within predetermined setting values; and finishing the control if it is determined that the coolant temperature and the air conditioner pressure of the stack and the electrical equipment are within predetermined setting values.

If it is determined that the air conditioner is not operated in the step of calculating the operation of the air conditioner, a step of calculating whether the first required speed A of the first cooling fan is equal to or larger than the second required speed C of the first cooling fan may be performed.

In the step of calculating whether the first required speed A of the first cooling fan is equal to or larger than the second required speed C of the first cooling fan, if the condition is satisfied, a step of operating the first cooling fan with the first required speed A of the first cooling fan and the second cooling fan with the first required speed B of the second cooling fan may be performed, and it is returned to the step of determining whether the coolant temperature and the air conditioner pressure of the stack and the electrical equipment are within the predetermined setting values.

In the step of calculating whether the first required speed A of the first cooling fan is equal to or larger than the second required speed C of the first cooling fan, if the condition is not satisfied, a step of operating the first cooling fan with the second required speed C of the first cooling fan and the second cooling fan with the first required speed B of the second cooling fan is performed, and it may be returned to the step of determining whether the coolant temperature and the air conditioner pressure of the stack and the electrical equipment are within the predetermined setting values.

In the step of calculating whether the first required speed A of the first cooling fan is equal to or larger than the second required speed C of the first cooling fan, and the first required speed B of the second cooling fan is equal to or larger than the second required speed D of the second cooling fan, if the condition is not satisfied, a step of calculating whether the first required speed A of the first cooling fan is equal to or larger than the second required speed C of the first cooling fan and the first required speed B of the second cooling fan is smaller than the second required speed D of the second cooling fan may be performed.

In the step of calculating whether the first required speed A of the first cooling fan is equal to or larger than the second required speed C of the first cooling fan and the first required speed B of the second cooling fan is smaller than the second required speed D of the second cooling fan, if the condition is not satisfied, a step of operating the first cooling fan with the first required speed A of the first cooling fan and the second cooling fan with the second required speed D of the second cooling fan may be performed, and it may be returned to the step of determining whether the coolant temperature and the air conditioner pressure of the stack and the electrical equipment are within the predetermined setting values.

In the step of calculating whether the first required speed A of the first cooling fan is equal to or larger than the second required speed C of the first cooling fan and the first required speed B of the second cooling fan is smaller than the second required speed D of the second cooling fan, if the condition is not satisfied, a step of calculating whether the first required speed A of the first cooling fan is smaller than the second required speed C of the first cooling fan and the first required speed B of the second cooling fan is equal to or larger than the second required speed D of the second cooling fan may be performed.

In the step of calculating whether the first required speed A of the first cooling fan is smaller than the second required speed C of the first cooling fan and the first required speed B of the second cooling fan is equal to or larger than the second required speed D of the second cooling fan, if the condition is satisfied, a step of operating the first cooling fan with the second required speed C of the first cooling fan and the second cooling fan with the first required speed B of the second cooling fan may be performed, and it may be returned to the step of determining whether the coolant temperature and the air conditioner pressure of the stack and the electrical equipment are within the predetermined setting values.

In the step of calculating whether the first required speed A of the first cooling fan is smaller than the second required speed C of the first cooling fan and the first required speed B of the second cooling fan is equal to or larger than the second required speed D of the second cooling fan, if the condition is not satisfied, a step of calculating whether the first required speed A of the first cooling fan is smaller than the second required speed C of the first cooling fan and the first required speed B of the second cooling fan is smaller than the second required speed D of the second cooling fan may be performed.

In the step of calculating whether the first required speed A of the first cooling fan is smaller than the second required speed C of the first cooling fan and the first required speed B of the second cooling fan is smaller than the second required speed D of the second cooling fan, if the condition is satisfied, a step of operating the first cooling fan with the second required speed C of the first cooling fan and the second cooling fan with the second required speed D of the second cooling fan is performed, and it may be returned to the step of determining whether the coolant temperature and the air conditioner pressure of the stack and the electrical equipment are within the predetermined setting values.

In the step of calculating whether the first required speed A of the first cooling fan is smaller than the second required speed C of the first cooling fan and the first required speed B of the second cooling fan is smaller than the second required speed D of the second cooling fan, if the condition is not satisfied, it may be returned to the step of operating the first cooling fan with the first required speed A of the first cooling fan and the second cooling fan with the first required speed B of the second cooling fan.

In the step of determining whether the coolant temperature and the air conditioner pressure of the stack and the electrical equipment are within the predetermined setting values, if the condition is not satisfied, it may be returned to the step of sensing the stack temperature and setting the first required speed A of the first cooling fan required by the stack radiator and the first required speed B of the second cooling fan.

Accordingly, if the method of controlling the cooling fan for the vehicle according to an exemplary embodiment of the present invention configured as described above is applied, when operating the first and second cooling fans provided as a pair in the cooling module depending the running state of the vehicle in the electric vehicle according to the running state and the air conditioner operation, by independently controlling the operation speed of the first and second cooling fans by comparing the cooling fan required speed of each of the constituent elements, the unnecessary power consumption may be prevented by minimizing the power consumption of the first and second cooling fans such that the entire travel distance (i.e., range) of the vehicle may be increased.

Further, as it is possible to ensure the performance of the cooling module without increasing the capacity of the first and second cooling fans, a mounting characteristic of the cooling module may be improved in the limited mounting space, and the operability and operation efficiency of the stack, the electrical equipment, and the air conditioner system mounted in the vehicle may be improved.

DETAILED DESCRIPTION OF THE EMBODIMENTS

Figure 1:
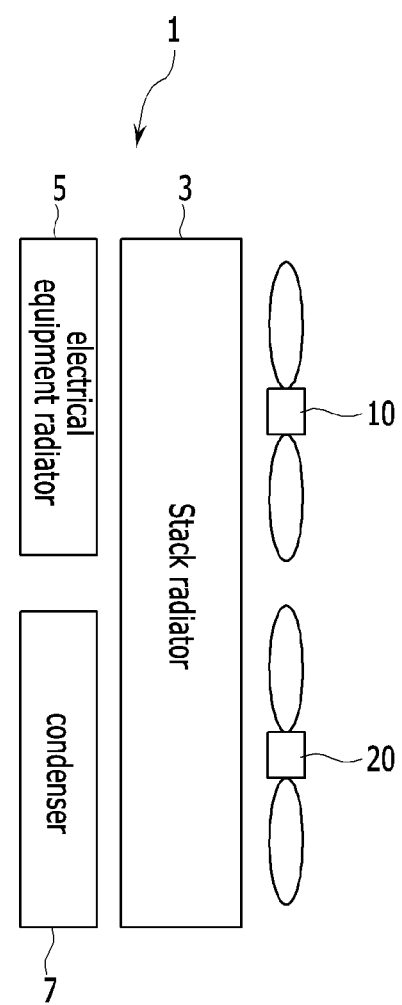
FIG. 1 is a schematic diagram of a cooling module applied to a method of controlling a cooling fan for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present invention will be described in detail hereinafter with reference to the accompanying drawings.

While this invention will be described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Components unrelated to the description will be omitted in order to obviously describe the present invention, and like reference numerals will be used to describe like components throughout the present specification.

Further, in the drawings, the sizes and thicknesses of the components are exemplarily provided for convenience of description, but the present invention is not limited to those shown in the drawings, and the thicknesses are exaggerated to clearly show several parts and regions.

Figure 2:
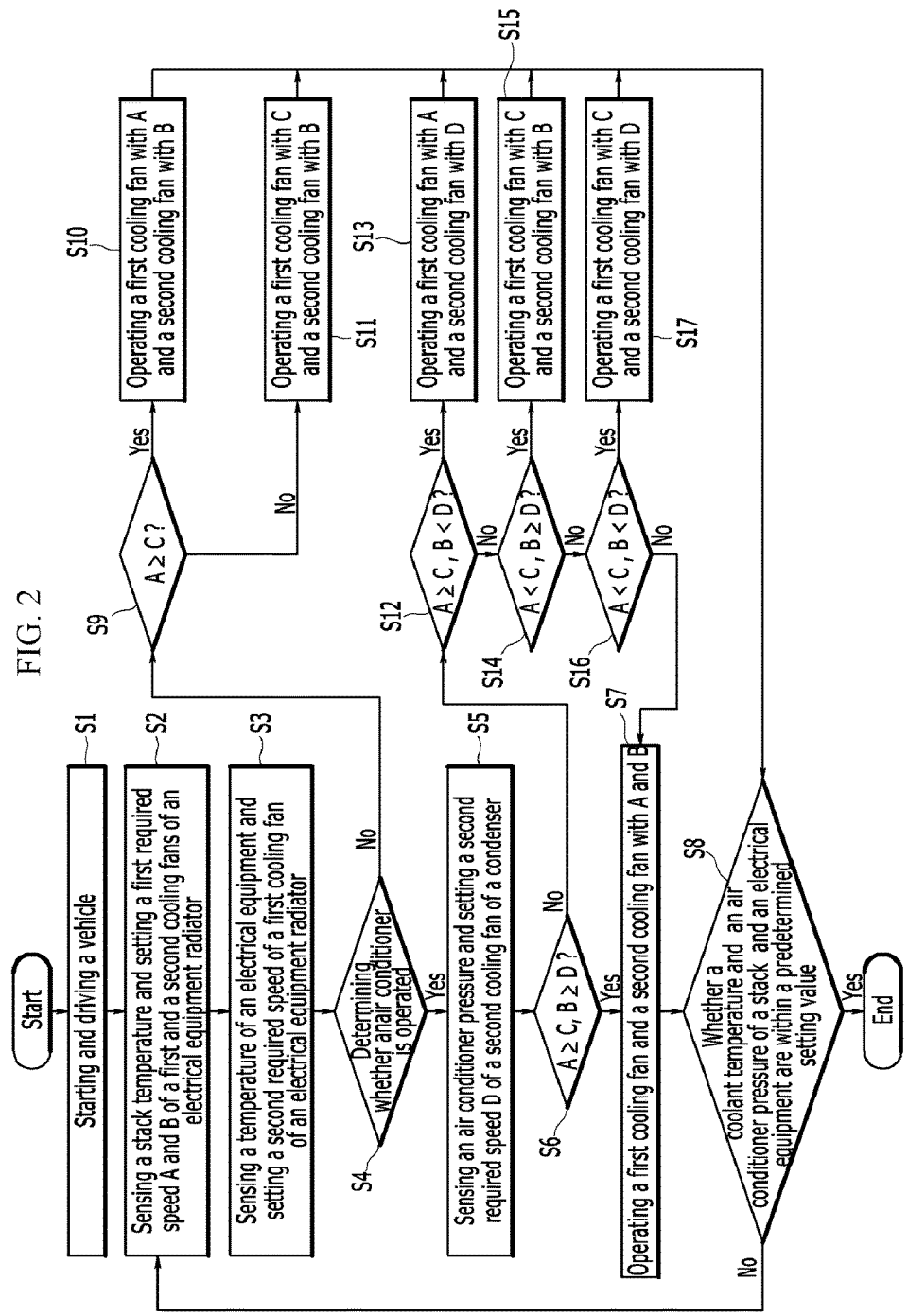
FIG. 2 is a control flowchart to explain a method of controlling a cooling fan for a vehicle according to an exemplary embodiment of the present invention.

FIG. 1 is a schematic diagram of a cooling module applied to a method of controlling a cooling fan for a vehicle according to an exemplary embodiment of the present invention, and FIG. 2 is a control flowchart to explain a method of controlling a cooling fan for a vehicle according to an exemplary embodiment of the present invention.

Referring to FIG. 1, a method of controlling a cooling fan for a vehicle according to an exemplary embodiment of the present invention is applied to an electric vehicle.

A cooling module 1 is equipped in front of the electric vehicle, and the cooling module 1 includes a stack radiator 3, an electrical equipment radiator 5, a condenser 7, and first and second cooling fans 10 and 20.

The stack radiator 3 supplies a coolant to a stack (a fuel cell). The electrical equipment radiator 5 is disposed to supply the coolant to the electrical equipment at one side of the front of the stack radiator 3. The condenser 7 is disposed to condense the coolant of an air conditioner system at the other side of the front of the stack radiator 3. That is, the electrical equipment radiator 5 and the condenser 7 are disposed in parallel with reference to a width direction of the vehicle.

Also, the first and second cooling fans 10 and 20 are equipped at positions respectively corresponding to the electrical equipment radiator 5 and the condenser 7 at the rear side of the stack radiator 3.

In the configuration of the cooling module 1, the method of controlling the cooling fan according to an exemplary embodiment of the present invention is applied to control the operation speed of the first cooling fan 10 and the second cooling fan 20 depending on the running state and the operation of the air conditioner system of the vehicle.

In the method of controlling the cooling fan for the vehicle according to an exemplary embodiment of the present invention, as shown in FIG. 2, in a state that starting of the vehicle is initiated to drive the vehicle (S1), the temperature of the stack is sensed, and a first required speed A of the first cooling fan 10 required by the stack radiator 3 and a first required speed B of the second cooling fan 20 are set (S2).

Next, the temperature of the electrical equipment mounted on the vehicle is sensed, and a second required speed C of the first cooling fan 10 required by the electrical equipment radiator 5 is set (S3).

Next, it is determined whether the air conditioner is operated in the vehicle (S4).

In the step (S4), if it is determined that the air conditioner of the vehicle is operated, an air conditioner pressure is sensed and a second required speed D of the second cooling fan 20 required by the condenser 7 is set (S5).

If the setting of the second required speed D of the second cooling fan 20 is completed, it is calculated (i.e., determined) whether the first required speed A of the first cooling fan 10 is equal to or larger than the second required speed C of the first cooling fan 10, and whether the first required speed B of the second cooling fan 20 is equal to or larger than the second required speed D of the second cooling fan 20 (S6).

In the step (S6), if the condition is satisfied, the first cooling fan 10 is operated at the first required speed A of the first cooling fan 10 and the second cooling fan 10 is operated at the first required speed B of the second cooling fan 20 (S7).

Next, it is determined whether the coolant temperature and the air conditioner pressure of the stack and the electrical equipment are within predetermined setting values (S8), and if it is determined that the coolant temperature and the air conditioner pressure of the stack and the electrical equipment are within the predetermined setting values, the control is stopped.

Here, in the step of determining the operation of the air conditioner (S4), if it is determined that the air conditioner is not operated, it is determined whether the first required speed A of the first cooling fan 10 is equal to or larger than the second required speed C of the first cooling fan 10 (S9).

In the step of calculating whether the first required speed A of the first cooling fan 10 is equal to or larger than the second required speed C of the first cooling fan 10 (S9), if the condition is satisfied, the first cooling fan 10 is operated at the first required speed A of the first cooling fan 10. Also, the second cooling fan 20 is operated at the first required speed B of the second cooling fan 20 (S10).

Next, if the first cooling fan 10 and the second cooling fan 20 are operated, it may be returned to the step (S8) of determining whether the coolant temperature and the air conditioner pressure of the stack and the electrical equipment are within the predetermined setting values.

In contrast, in the step (S9) of calculating whether the first required speed A of the first cooling fan 10 is equal to or larger than the second required speed C of the first cooling fan 10, if the condition is not satisfied, the first cooling fan 10 is operated at the second required speed C of the first cooling fan 10. Also, the second cooling fan 20 is operated at the first required speed B of the second cooling fan 20 (S11).

Next, if the first cooling fan 10 and the second cooling fan 20 are operated, it may be returned to the step (S8) of determining whether the coolant temperature and the air conditioner pressure of the stack and the electrical equipment are within the predetermined setting values.

That is, in the method of controlling the cooling fan for the vehicle according to an exemplary embodiment of the present invention, by independently controlling the first and second cooling fans 10 and 20 with the larger required speed by comparing the required speeds of the first and second cooling fans 10 and 20 required to cool the stack radiator 3 depending on the running state of the vehicle and the required speed of the first cooling fan 10 required to cool the electrical equipment radiator 5, efficient cooling of the cooling module 1 may be performed.

Meanwhile, in the step (S6) of calculating whether the first required speed A of the first cooling fan 10 is equal to or larger than the second required speed C of the first cooling fan 10 and the first required speed B of the second cooling fan 20 is equal to or larger than the second required speed D of the second cooling fan 20, if the condition is not satisfied, it is determined whether the first required speed A of the first cooling fan 10 is equal to or larger than the second required speed C of the first cooling fan 10 and the first required speed B of the second cooling fan 20 is smaller than the second required speed D of the second cooling fan 20 (S12).

In the step (S12), if the condition is satisfied, the first cooling fan 10 is operated at the first required speed A of the first cooling fan 10. Also, the second cooling fan 20 is operated at the second required speed D of the second cooling fan 20 (S13).

Next, if the first cooling fan 10 and the second cooling fan 20 are operated, it may be returned to the step (S8) of determining whether the coolant temperature and the air conditioner pressure of the stack and the electrical equipment are within the predetermined setting values.

In contrast, in the step (S12), if the condition is satisfied, it is determined whether the first required speed A of the first cooling fan 10 is smaller than the second required speed C of the first cooling fan 10 and the first required speed B of the second cooling fan 20 is equal to or larger than the second required speed D of the second cooling fan 20 (S14).

In the step (S14), if the condition is satisfied, the first cooling fan 10 is operated at the second required speed C of the first cooling fan 10, and the second cooling fan 20 is operated at the first required speed B of the second cooling fan 20 (S15).

Next, if the first cooling fan 10 and the second cooling fan 20 are operated, it is returned to the step (S8) of determining whether the coolant temperature and the air conditioner pressure of the stack and the electrical equipment are within the predetermined setting values.

In contrast, in the step (S14), if the condition is not satisfied, it is determined whether the first required speed A of the first cooling fan 10 is smaller than the second required speed C of the first cooling fan 10, and the first required speed B of the second cooling fan 20 is smaller than the second required speed D of the second cooling fan 20 (S16).

If the first required speed A of the first cooling fan 10 is smaller than the second required speed C of the first cooling fan 10 and the first required speed B of the second cooling fan 20 is smaller than the second required speed D of the second cooling fan 20 (S16), the first cooling fan 10 is operated at the second required speed C of the first cooling fan 10 and the second cooling fan 20 is operated at the second required speed D of the second cooling fan 20 (S17).

Next, if the first cooling fan 10 and the second cooling fan 20 are operated, it is returned to the step (S8) of determining whether the coolant temperature and the air conditioner pressure of the stack and the electrical equipment are within the predetermined setting values.

In contrast, in the step (S16), if the condition is not satisfied, it may be returned to the step (S7) in which the first cooling fan 10 is operated at the first required speed A of the first cooling fan 10 and the second cooling fan 20 is operated at the first required speed B of the second cooling fan 20.

Meanwhile, in the present exemplary embodiment, in the step (S8) of determining whether the coolant temperature and the air conditioner pressure of the stack and the electrical equipment are within the predetermined setting values, if the condition is not satisfied, the stack temperature is sensed, and it may be returned to the step (S2) of setting the first required speed A of the first cooling fan required by the stack radiator and the first required speed B of the second cooling fan.

That is, while the method of controlling the cooling fan for the vehicle according to an exemplary embodiment of the present invention repeats the above-described process, depending on the operation of the running state and the operation of the air conditioner of the vehicle, by independently controlling the first and second cooling fans 10 and 20 with the larger required speed by comparing the required speed of the first and second cooling fans 10 and 20 required to cool the stack radiator 3, the required speed of the first cooling fan 10 required to cool the electrical equipment radiator 5, and the required speed of the second cooling fan 20 required to cool the condenser 7, the efficient cooling of the cooling module 1 may be performed.

Accordingly, if the method of controlling the cooling fan for the vehicle according to an exemplary embodiment of the present invention configured as above described is applied, when operating the first and second cooling fans 10 and 20 provided as a pair in the cooling module 1 depending the running state of the vehicle in the electric vehicle according to the running state and the air conditioner operation, by independently controlling the operation speeds of the first and second cooling fans 10 and 20 by comparing the cooling fan required speed of each of the constituent elements, the unnecessary power consumption may be prevented by minimizing the power consumption of the first and second cooling fans 10 and 20 and the entire travel distance (i.e., range) of the vehicle may be increased.

Also, as it is possible to ensure the performance of the cooling module 1 without the capacity increase of the first and the second cooling fans 10 and 20, a mounting characteristic of the cooling module 1 is improved in the limited mounting space, and the operability and the operation efficiency of the stack, the electrical equipment, and the air conditioner system mounted in the vehicle may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling cooling fans for a vehicle to control operation speeds of first and second cooling fans depending on a running state and an operation of an air conditioner of the vehicle in a cooling module including a stack radiator, an electrical equipment radiator disposed in front of the stack radiator, a condenser disposed in parallel with reference to a width direction of the electrical equipment radiator and the vehicle, and the first and second cooling fans provided at positions respectively corresponding to the electrical equipment radiator and the condenser in the rear of the stack radiator, the method comprising the steps of:
    initiating starting of the vehicle to be driven;
    sensing a stack temperature and setting a first required speed of the first cooling fan required by the stack radiator and a first required speed of the second cooling fan;
    sensing a temperature of electrical equipment and setting a second required speed of the first cooling fan required by the electrical equipment radiator;
    determining whether the air conditioner is operated;
    sensing an air conditioner pressure and setting a second required speed of the second cooling fan required by the condenser if it is determined that the air conditioner is operated;
    calculating whether the first required speed of the first cooling fan is equal to or larger than the second required speed of the first cooling fan and the first required speed of the second cooling fan is equal to or larger than the second required speed of the second cooling fan;
    operating the first cooling fan with the first required speed of the first cooling fan and the second cooling fan with the first required speed of the second cooling fan if the condition is satisfied in the calculating step;
    determining whether the coolant temperature and the air conditioner pressure of the stack and the electrical equipment are within predetermined setting values; and
    finishing the control if it is determined that the coolant temperature and the air conditioner pressure of the stack and the electrical equipment are within predetermined setting values.

2. The method of claim 1, wherein:
    if it is determined that the air conditioner is not operated in the step of determining the operation of the air conditioner, a step of calculating whether the first required speed of the first cooling fan is equal to or larger than the second required speed of the first cooling fan is performed.

3. The method of claim 2, wherein:
    in the step of calculating whether the first required speed of the first cooling fan is equal to or larger than the second required speed of the first cooling fan,
    if the condition is satisfied, a step of operating the first cooling fan with the first required speed of the first cooling fan and the second cooling fan with the first required speed of the second cooling fan is performed and it is returned to the step of determining whether the coolant temperature and the air conditioner pressure of the stack and the electrical equipment are within the predetermined setting values.

4. The method of claim 2, wherein:
    in the step of calculating whether the first required speed of the first cooling fan is equal to or larger than the second required speed of the first cooling fan,
    if the condition is not satisfied, a step of operating the first cooling fan with the second required speed of the first cooling fan and the second cooling fan with the first required speed of the second cooling fan is performed, and it is returned to the step of determining whether the coolant temperature and the air conditioner pressure of the stack and the electrical equipment are within the predetermined setting values.

5. The method of claim 1, wherein:
    in the step of calculating whether the first required speed of the first cooling fan is equal to or larger than the second required speed of the first cooling fan, and the first required speed of the second cooling fan is equal to or larger than the second required speed of the second cooling fan,
    if the condition is not satisfied, a step of calculating whether the first required speed of the first cooling fan is equal to or larger than the second required speed of the first cooling fan and the first required speed of the second cooling fan is smaller than the second required speed of the second cooling fan is performed.

6. The method of claim 5, wherein:
    in the step of calculating whether the first required speed of the first cooling fan is equal to or larger than the second required speed of the first cooling fan, and the first required speed of the second cooling fan is smaller than the second required speed of the second cooling fan,
    if the condition is not satisfied, a step of operating the first cooling fan with the first required speed of the first cooling fan and the second cooling fan with the second required speed of the second cooling fan is performed, and it is returned to the step of determining whether the coolant temperature and the air conditioner pressure of the stack and the electrical equipment are within the predetermined setting values.

7. The method of claim 5, wherein:
    in the step of calculating whether the first required speed of the first cooling fan is equal to or larger than the second required speed of the first cooling fan, and the first required speed of the second cooling fan is smaller than the second required speed of the second cooling fan,
    if the condition is not satisfied, a step of calculating whether the first required speed of the first cooling fan is smaller than the second required speed of the first cooling fan and the first required speed of the second cooling fan is equal to or larger than the second required speed D of the second cooling fan is performed.

8. The method of claim 7, wherein:
in the step of calculating whether the first required speed of the first cooling fan is smaller than the second required speed of the first cooling fan and the first required speed of the second cooling fan is equal to or larger than the second required speed of the second cooling fan,
if the condition is satisfied, a step of operating the first cooling fan with the second required speed of the first cooling fan and the second cooling fan with the first required speed of the second cooling fan is performed, and it is returned to the step of determining whether the coolant temperature and the air conditioner pressure of the stack and the electrical equipment are within the predetermined setting values.

9. The method of claim 7, wherein:
in the step of calculating whether the first required speed of the first cooling fan is smaller than the second required speed of the first cooling fan and the first required speed of the second cooling fan is equal to or larger than the second required speed of the second cooling fan,
if the condition is not satisfied, a step of calculating whether the first required speed of the first cooling fan is smaller than the second required speed of the first cooling fan and the first required speed of the second cooling fan is smaller than the second required speed of the second cooling fan is performed.

10. The method of claim 9, wherein:
in the step of calculating whether the first required speed of the first cooling fan is smaller than the second required speed of the first cooling fan and the first required speed of the second cooling fan is smaller than the second required speed of the second cooling fan,
if the condition is satisfied, a step of operating the first cooling fan with the second required speed of the first cooling fan and the second cooling fan with the second required speed of the second cooling fan is performed, and it is returned to the step of determining whether the coolant temperature and the air conditioner pressure of the stack and the electrical equipment are within the predetermined setting values.

11. The method of claim 9, wherein:
in the step of calculating whether the first required speed of the first cooling fan is smaller than the second required speed of the first cooling fan and the first required speed of the second cooling fan is smaller than the second required speed of the second cooling fan,
if the condition is not satisfied, it is returned to the step of operating the first cooling fan with the first required speed of the first cooling fan and the second cooling fan with the first required speed of the second cooling fan.

12. The method of claim 1, wherein:
in the step of determining whether the coolant temperature and the air conditioner pressure of the stack and the electrical equipment are within the predetermined setting values, if the condition is not satisfied, it is returned to the step of sensing the stack temperature and setting the first required speed of the first cooling fan required by the stack radiator and the first required speed of the second cooling fan.

* * * * *